Oct. 29, 1968     A. BOUDOURIS     3,408,651
AIRCRAFT COLLISION AVOIDANCE SYSTEM
Filed Dec. 27, 1966
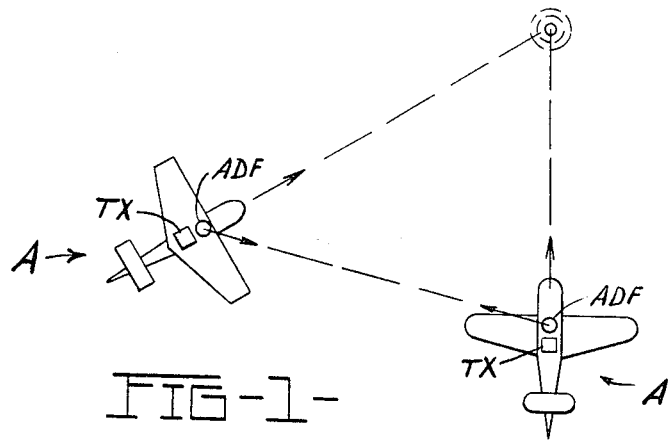
FIG-1-
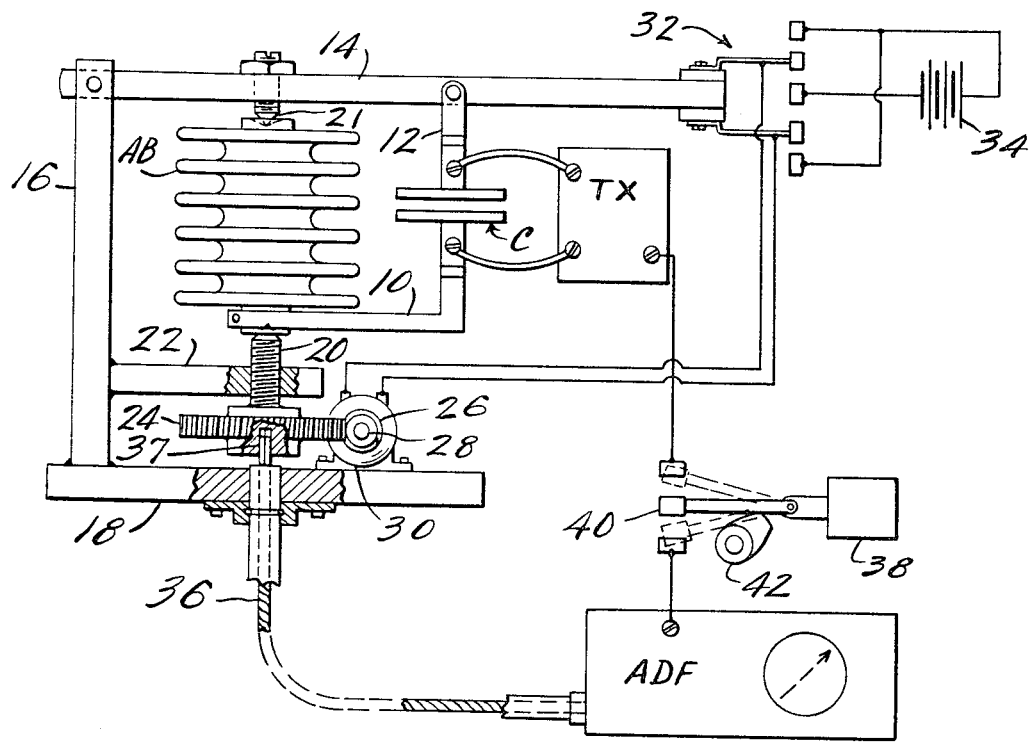
FIG-2-
INVENTOR:
ANGELO BOUDOURIS.
BY
ATT'YS.

3,408,651
AIRCRAFT COLLISION AVOIDANCE SYSTEM
Angelo Boudouris, 5856 Highlandview Drive,
Sylvania, Ohio 43560
Filed Dec. 27, 1966, Ser. No. 604,928
6 Claims. (Cl. 343—112)

ABSTRACT OF THE DISCLOSURE

An aircraft collision avoidance system includes a transmitter and a receiver the frequency of both of which is maintained equal and is varied in response to the altitude. The transmitter and receiver preferably are alternately operated at different time periods in order to sense other aircraft at the same altitude transmitting on the same frequency.

---

This invention relates to apparatus for effecting the avoidance of aircraft collisions.

The frequency of mid-air collisions of aircraft has increased greatly wtih the increase in air traffic in recent years. This has been noted by the Federal Aviation Agency and other organizations, and a number of ideas have heretofore been proposed in an attempt to overcome this problem. One approach has been to provide improved ground controls by means of which aircraft can be accounted for and maintained at properly spaced altitudes or intervals more effectively. Along this line, attempts have been made to improve the efficiency of air traffic control centers through the use of computers and computerized equipment. This approach has met with little, if any, success, however. Efforts have also been directed to the development of three-dimensional radar for determining the positions of aircraft and appropriately directing them. Such equipment has lacked the necessary sensitivity, however, and even if such apparatus were successful, it would be available in only limited locations around the country because of the size and cost of such equipment. Controls to be carried in aircraft have also been proposed for detecting other aircraft. These controls, however, have been entirely too expensive for smaller aircraft, too complex, or too heavy. All three disadvantages have, in fact, prevailed in most systems heretofore suggested.

The present invention relates to an aircraft anti-collision and avoidance system which has many advantages over those heretofore proposed. The components of the new system are designed to be carried by aircraft so as to be operable and available at any location. The components of the system are relatively inexpensive, light in weight, and relatively simple so that maintenance is less frequent and less costly.

In a preferred form, the new system employs an automatic direction finder to sense and indicate the location of another aircraft and a low power transmitter to provide a sensing signal so that the other aircraft will be aware of the first one. The frequency to which the automatic direction finder is sensitive and the frequency at which the transmitter transmits can be automatically controlled in response to the altitude. Consequently, aircraft at other altitudes will not be sensed by the system.

An altitude sensing device which has an aneroid bellows in combination with suitable servomechanism can be employed to achieve the desired frequency control. Suitable means can also be employed to control the transmitting and receiving of the components of the system to prevent interference between transmitting and receiving. The system also can be useful even if only the transmitting component thereof is employed. Thus, in small, less expensive aircraft, where the cost of the complete system would be prohibitive, only the transmitter might be used. In this manner, other aircraft containing both the transmitter and sensing device can take necessary evasive action when the presence of the first aircraft is sensed.

It is, therefore, a principal object of the invention to provide an aircraft anti-collision and avoidance system having the advantages outlined above.

Numerous other objects and advantages of the invention will be apparent from the following detailed description of a preferred embodiment thereof, reference being made to the drawings, in which:

FIG. 1 is a diagrammatic, plan view of two aircraft on a collision course, which aircraft are equipped with the aircraft anti-collision and avoidance system according to the invention; and FIG. 2 is a schematic view of components of the anti-collision system in accordance with the invention.

Referring to FIG. 1, if two aircraft designated A incorporating the invention are on a collision course, automatic direction finders designated ADF of each aircraft will point toward the opposite one. If the direction remains constant, either pilot knows he is on a collision course with the other aircraft and can take appropriate evasive action. Each of the aircraft is also provided with a low frequency, low power transmitter, designated TX, which provides a homing signal for the automatic direction finder of the other aircraft. The transmitter TX can be of small, light-weight design, weighing in the order of only five pounds, to add very little load to the aircraft. A transmitter of this type also is of relatively low cost so as to be within the range of most aircraft owners. Consequently, almost any aircraft can employ one of these transmitters, at a minimum, to indicate the presence of the aircraft to others even if the aircraft does not carry the direction finder.

In order that the automatic direction finder will not sense aircraft which are at substantially higher or lower altitudes, the frequency to which the direction finder is sensitive and the frequency at which the transmitter transmits are controlled in accordance with the altitude of the aircraft. For this purpose, the apparatus shown in FIG. 2 can be employed. Accordingly, the transmitter TX has a variable capacitor designated C which controls the frequency of the transmitter. The spacing of the capacitor C can be varied by means of an aneroid bellows designated AB. One end of the bellows AB can be connected with a plate of the capacitor C through a suitable connecting bar 10, with the other plate of the capacitor connected through a suitable bar 12 to an operating lever 14. The lever 14 is pivoted to a vertical support 16 and moves up and down when the bellows AB contracts and expands. As the bellows AB expands, the lever 14 tends to pivot in a counterclockwise direction and increase the spacing between the plates of the capacitor C, and vice versa. With this arrangement, the frequency of the transmitter can be changed in accordance with the altitude. By way of example, the transmitting frequency can be set at 350 kc. at standard sea level, at a frequency of 360 kc. at an altitude of 10,000 feet above standard sea level, and at a frequency of 370 kc. at an altitude of 100,000 feet. The frequency shift tends to be exponential in the example, because the pressure drop is not linear.

The vertical support 16 is mounted on a suitable fixed support or platform 18. The support 16 can be of a material which expands and contracts at a predetermined rate with change in temperature, if desired, to compensate for and thereby overcome the effect of a change in temperature on the air pressure.

The aneroid bellows is not connected directly between the operating lever 14 and the support 18 but between the lever and an adjusting screw 20. A correction screw 21 also can be used, if desired, to manually correct the components to the proper frequency-altitude relationship, if necessary. The screw 20 is threadedly engaged in a supporting arm 22 extending from the vertical support 16 and can be turned up or down by means of a suitable worm wheel or gear 24 engaged by a worm or other gear 26. The worm 26 is connected by a shaft 28 to a motor 30 which can be of the permanent magnet type, for example.

The motor 30 can be operated through a switch assembly designated 32 by a suitable D.C. power source 34, shown as a battery. When the operating lever 14 is in an upper position, the D.C. source 34 is connected to the motor 30 in one direction and when the operating lever 14 is in a lower position, the power source 34 is connected to the motor 30 in the opposite direction. This causes the bellows AB to move up or down according to the direction in which the screw 20 is rotated but does not, in itself, change the frequency of the transmitter TX since the spacing between the plates of the capacitor C will not be changed.

Rotation of the screw 20 also causes rotation of a flexible shaft or cable 36 concentric with the screw 20 and rotatable with the gear 24. For this purpose, the shaft 36 can have a square end 37 which is slidably received in a central passage in the gear 24. Rotation of the flexible shaft 36 changes the receiving frequency of the automatic direction finder ADF so as to be sensitive to the frequency at which the transmitter TX transmits. Automatic direction finders of this type are commercially available, the flexible shaft commonly being controlled by a pilot, with the instrument remotely located with respect to the instrument panel because of space considerations.

In the operation of the system, as an aircraft climbs to a higher altitude, the bellows AB will expand and decrease the capacitance of the capacitor C by increasing the spacing between the plates thereof. This will cause an increase in the frequency at which the transmitter TX transmits. The resulting raising of the lever 14 causes the switch assembly 32 to connect the motor 30 and the D.C. source 34 in a manner such as to tend to lower the screw 20 and rotate the flexible shaft 36 so as to increase the frequency which the automatic direction finder receives or to which it is sensitive. The lowering of the screw 20 shortly breaks the connection of the switch assembly 32 and stops the rotation of the shaft 36. The transmitter TX then transmits at a particular frequency and the automatic direction finder receives or is sensitive to that frequency until the aircraft again changes altitude.

If the aircraft move toward a lower altitude, the bellows AB contracts to swing the arm 14 in a clockwise direction and to decrease the spacing between the plates of the capacitor C and lower the transmitting frequency. At the same time, the switch assembly 32 is caused by the operating lever 14 to drive the motor 30 in the opposite direction and raise the screw 20 until the contacts of the switch assembly 32 again are broken. At the same time, the flexible shaft 36 is rotated to lower the sensing frequency of the automatic direction finder.

While it is possible to arrange the antenna of the transmitter TX so as not to have any effect on the automatic direction finder ADF, preferably the transmitter and receiver of the ADF are controlled so as to be sensitive alternately. The periods of transmission and reception also preferably are for dissimilar lengths of time, one of which is not an integral multiple of the other, so that it is less likely that the systems of two aircraft would be synchronized in a manner such that both transmit at the same time and receive at the same time so as to be insensitive to one another. For this purpose, a suitable power source 38 for the transmitter and direction finder can be alternately connected to one or the other through contacts 40 which are operated by a cam 42 which can be driven by a suitable motor (not shown). By way of example, the transmitter can be designed to transmit for one second and the direction finder then be operable for ten seconds. If the automatic direction finder receives a signal, it can cut in another timing circuit operated by a different cam so that the transmitter is then on for two seconds and the direction finder on for three seconds, by way of example.

As indicated above, if another aircraft is in the vicinity, the arrow of the direction finder will point toward it, in accordance with the usual operation of an automatic direction finder. In the event that the direction of the other plane remain constant, it indicates that the two aircraft are on a collision course and the pilot can then take appropriate evasive action. A suitable audible or visual signal can also be energized when another plane is sensed to more effectively bring the presence of the other plane to the attention of the pilot.

Numerous modifications of the above described embodiment of the invention will be apparent to those skilled in the art, and it is to be understood that such modifications can be made without departing from the scope of the invention, if they are within the spirit and the tenor of the accompanying claims.

I claim:

1. An aircraft anti-collision and avoidance system comprising a low power transmitter, an automatic direction finder comprising a receiver for receiving a signal and means for indicating the direction from which the signal emanates, an altitude-sensitive bellows connected with said transmitter to set the transmitting frequency in response to the altitude, and servomotor means connecting said bellows, and said automatic direction finder to set the receiving frequency equal to the transmitting frequency.

2. A system according to claim 1 characterized by timing means for alternately controlling the operation of said receiver and said transmitter for dissimilar periods of time.

3. An aircraft anti-collision and avoidance system comprising a transmitter having a variable capacitor by means of which the transmitting frequency can be changed, an automatic direction finder including a receiver, the receiving frequency of which can be controlled, and means for indicating the direction from which a received frequency comes, an altitude sensitive bellows, means connecting said bellows and said capacitor to increase the spacing between the capacitor plates when the bellows expands, means supporting one end of said bellows, and means for moving said supporting means such that the free end of the bellows remains substantially fixed in position, and means for changing the frequency of said direction finder as a function of the movement of said supporting means.

4. A system according to claim 3 characterized by said last-named means comprises a motor, means connecting said motor and said supporting means, a power source, and a switch assembly connecting said power source and said motor, the operation of said switch assembly being controlled by said bellows.

5. A system according to claim 4 characterized by said supporting means comprising a screw, a flexible shaft associated with said screw and revolvable when said screw is revolved, said flexible shaft being connected to said receiver of said automatic direction finder whereby when said screw is turned toward said bellows, said flexible shaft decreases the frequency of the automatic direction finder receiver.

6. In an aircraft anti-collision and avoidance system, a transmitter, altitude-sensing means, means connecting said sensing means and said transmitter to change the transmitting frequency of said transmitter in response to the altitude, an automatic direction finder including receiving means, means connecting said altitude-sensing means with said direction finder to set the receiving frequency thereof equal to the transmitting frequency of the transmitter, and timing means for alternately operating said transmitter and said direction finder for dissimilar periods of time.

References Cited

UNITED STATES PATENTS

| 2,042,490 | 6/1936 | Zahl. | |
|---|---|---|---|
| 2,646,682 | 7/1953 | Ovtschinnikoff | 73—386 |
| 2,886,796 | 5/1959 | Wallace. | |

RODNEY D. BENNETT, *Primary Examiner.*

RICHARD E. BERGER, *Assistant Examiner.*